UNITED STATES PATENT OFFICE.

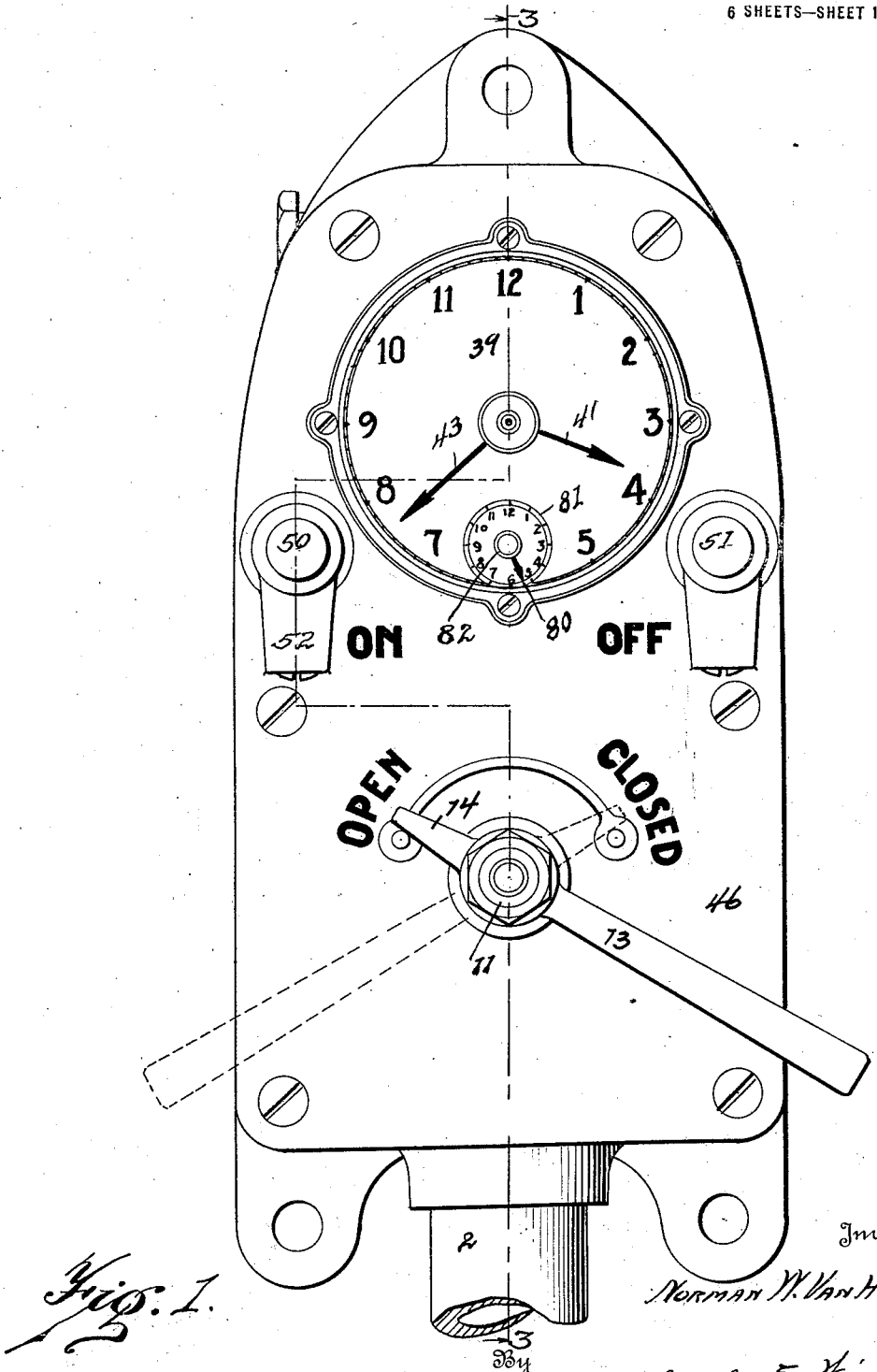

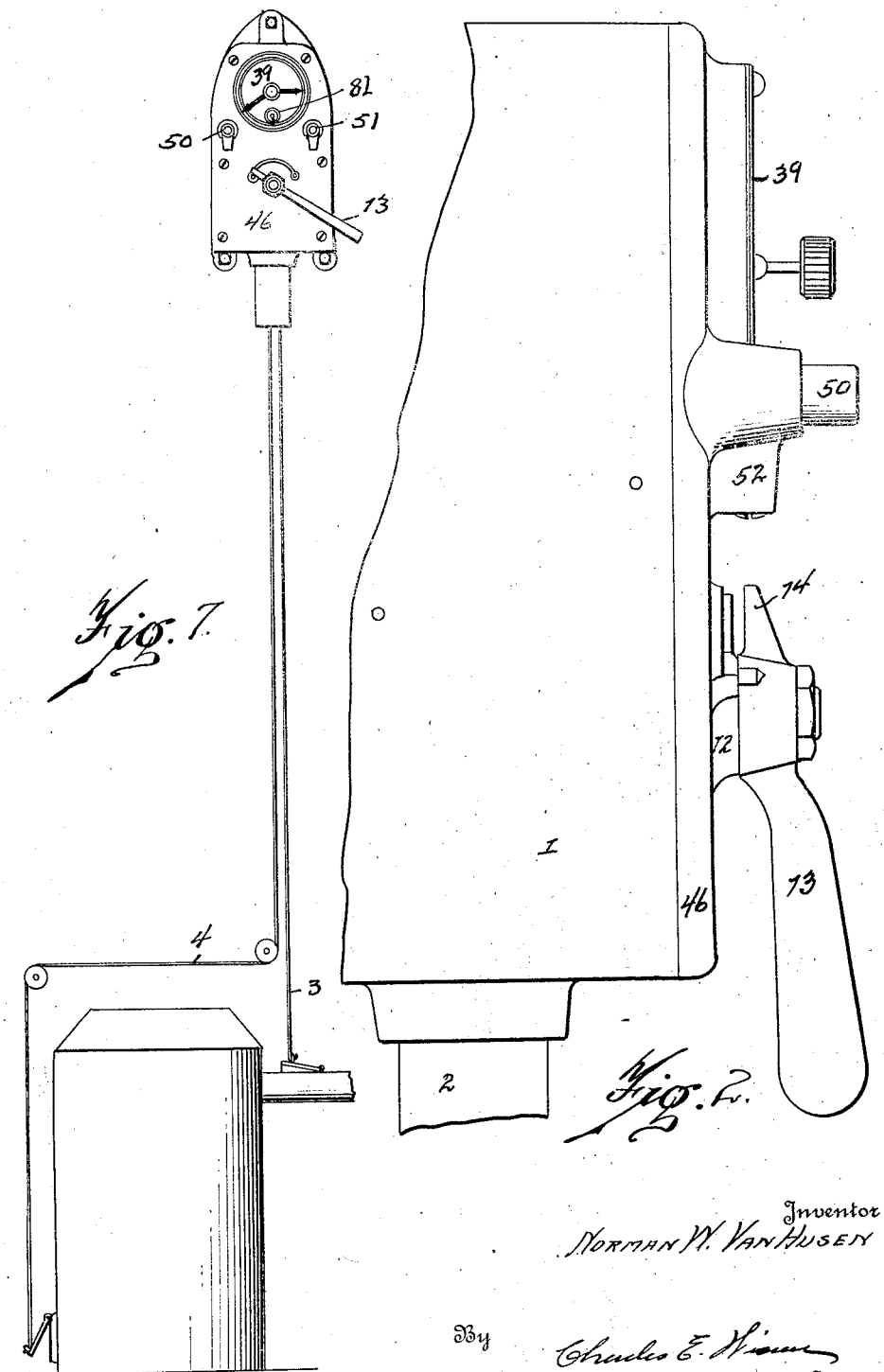

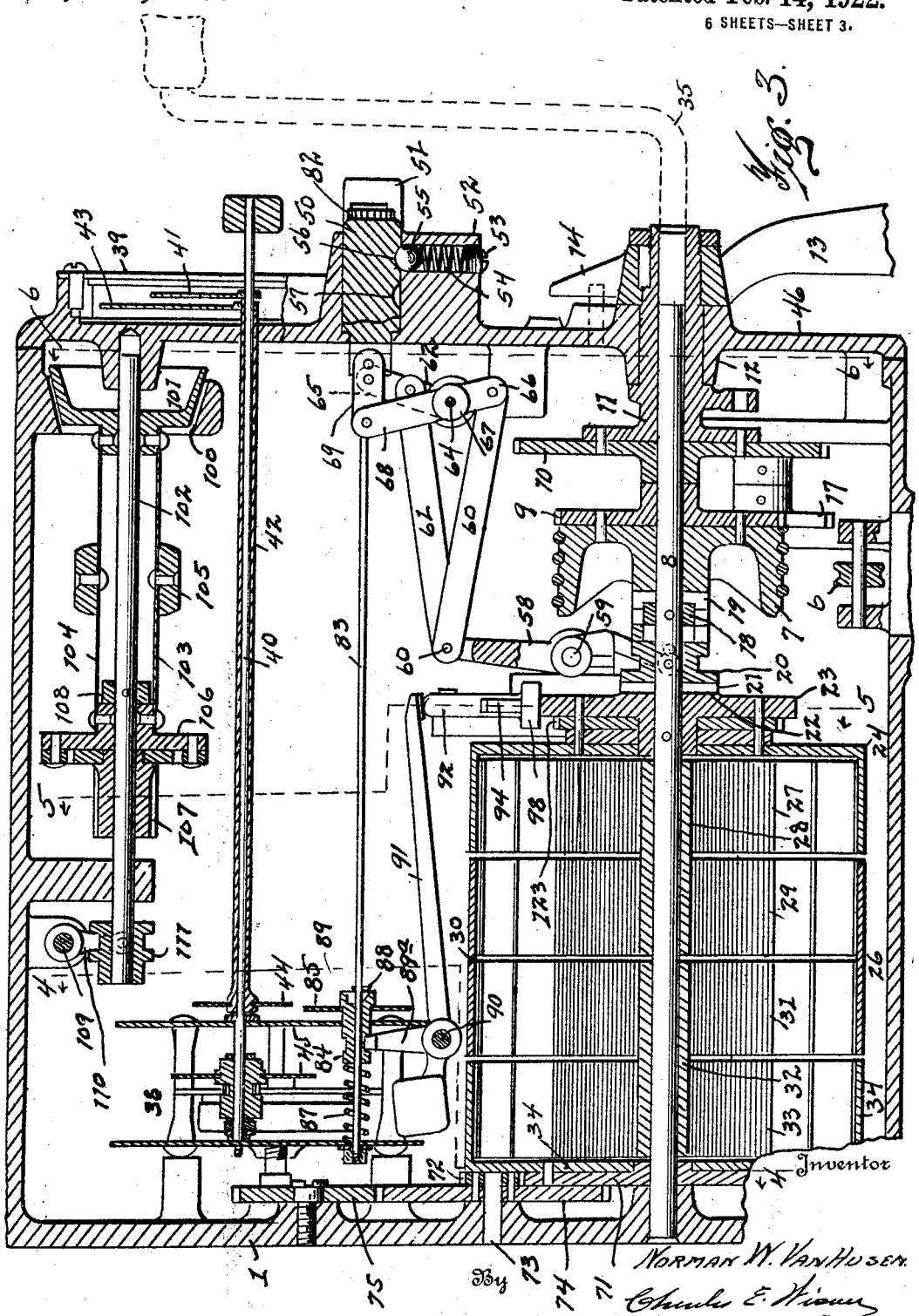

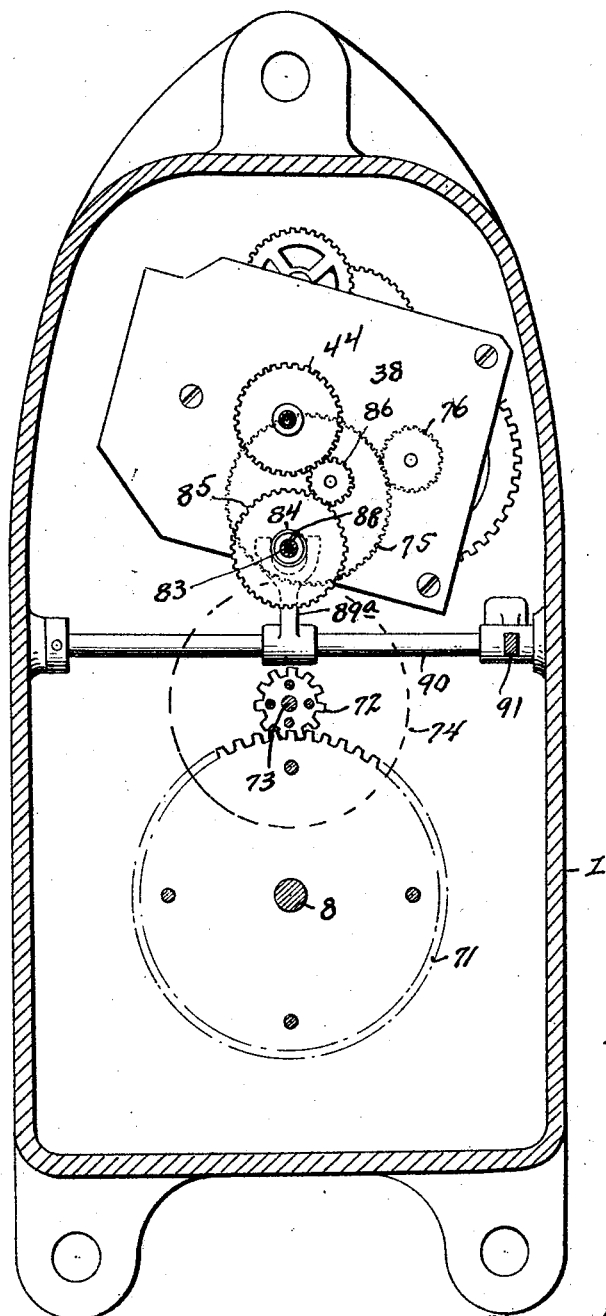

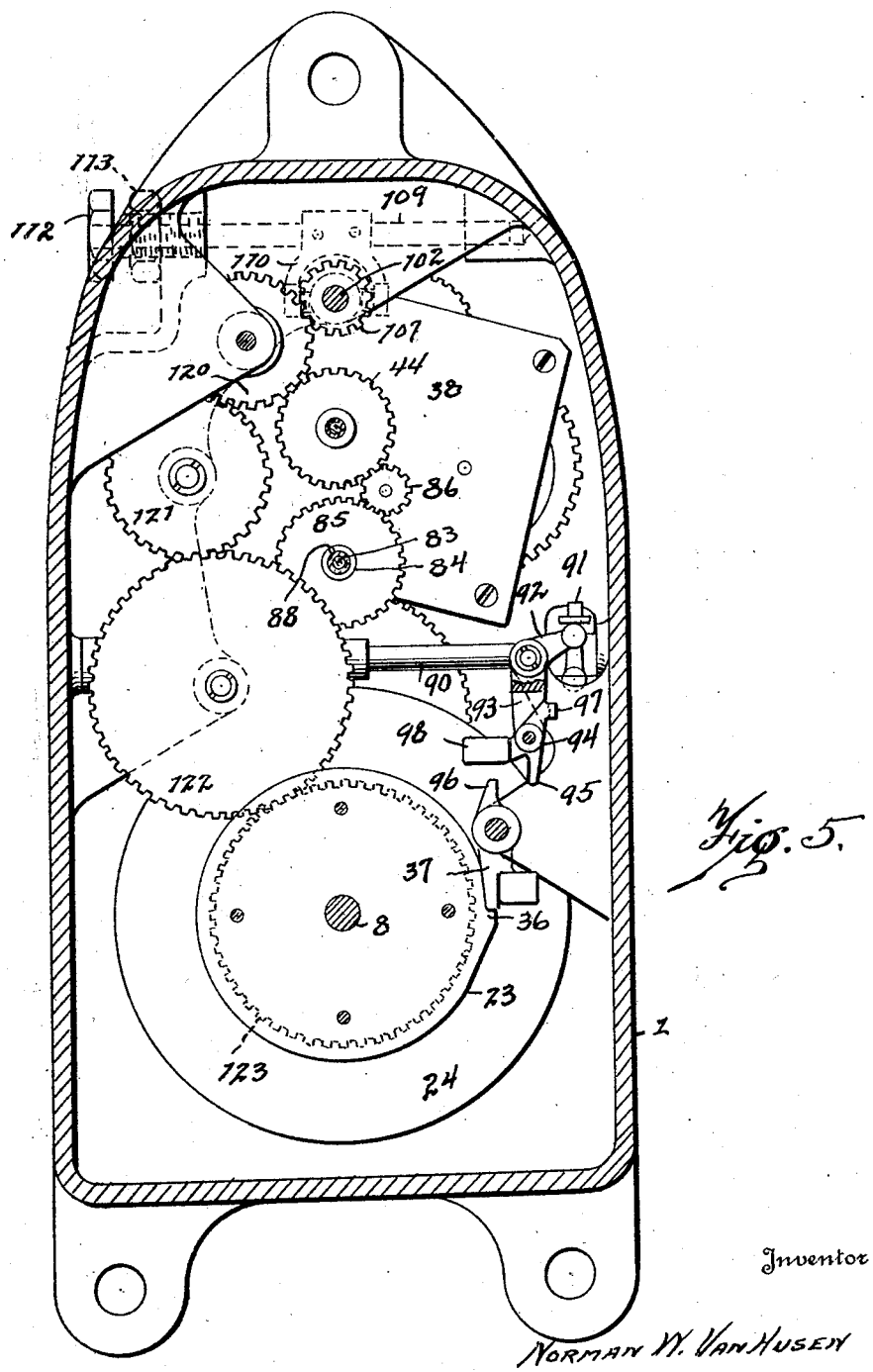

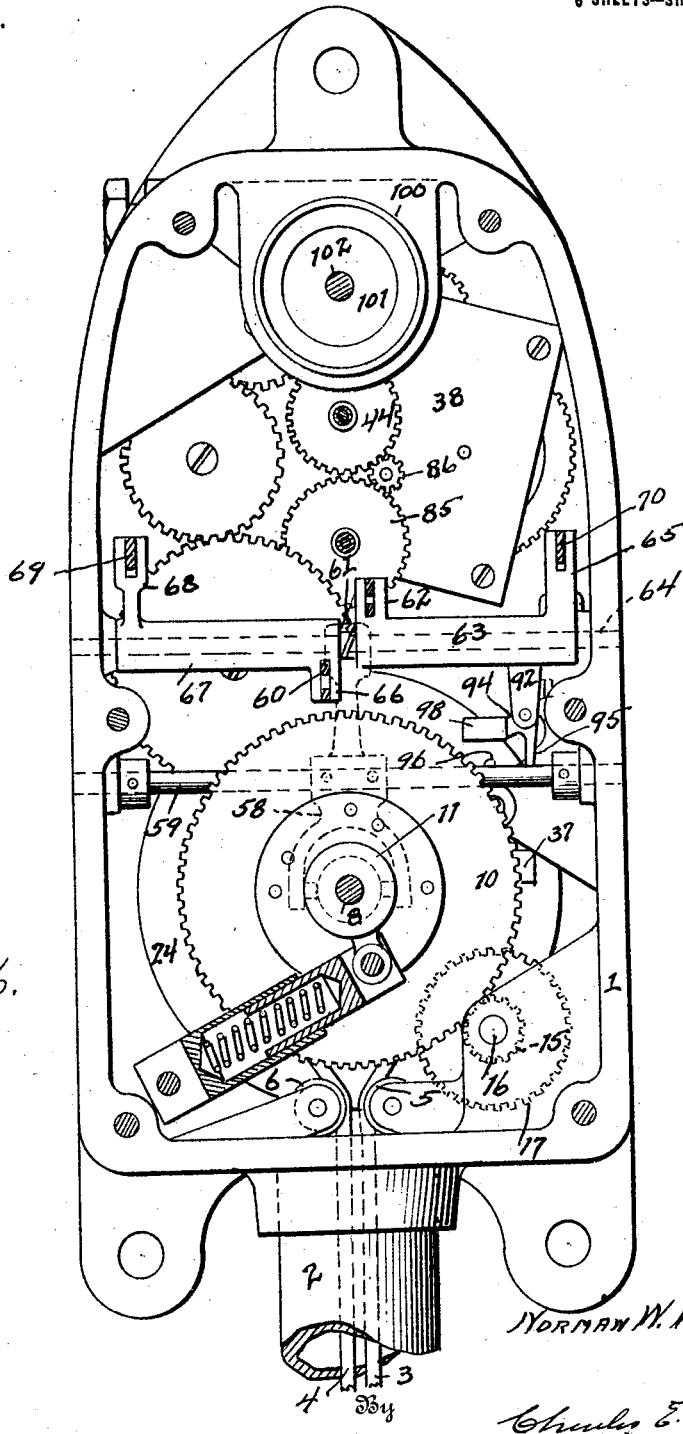

NORMAN W. VAN HUSEN, OF DETROIT, MICHIGAN.

DRAFT REGULATOR FOR FURNACES.

1,406,305.   Specification of Letters Patent.   Patented Feb. 14, 1922.

Application filed May 22, 1920. Serial No. 383,393.

*To all whom it may concern:*

Be it known that I, NORMAN W. VAN HUSEN, a citizen of the United States, residing at Detroit, county of Wayne, State of Michigan, have invented a certain new and useful Improvement in Draft Regulators for Furnaces, and declare the following to be a full, clear, and exact description of the same, such as will enable others skilled in the art to which it pertains to make and use the same, reference being had to the accompanying drawings, which form a part of this specification.

This invention relates to furnace regulators, and the object is to provide an automatically operating device to open the draft damper of the furnace, the device including a clock mechanism adapted to release the actuating mechanism to operate at a predetermined time, and to open the draft. A further object is to provide means for manually operating the draft damper and for setting the mechanism to prevent automatic operation while permitting the manual operation of the draft. A further feature of the invention is involved in the use of a spring motor and the construction in conjunction therewith whereby the clock mechanism is actuated by the spring of the motor, which motor is also utilized to operate the draft device. An additional feature is involved in the means for connecting or disconnecting the motor with the draft operating means and automatic brake mechanism preventing a too rapid operation of the spring motor when released. Further features of the invention are involved in the means of control of the motor and for connecting or disconnecting the same with the draft operating device and further, in the means whereby the clock mechanism releases the motor to operation. These and other objects and the various novel features of the invention are hereinafter more fully described and claimed, and the preferred form of construction embodying my invention is shown in the accompanying drawings in which—

Fig. 1 is a front elevation of a draft regulator embodying my invention showing manual control levers.

Fig. 2 is a side elevation partly broken away.

Fig. 3 is a vertical longitudinal section on line 3—3 of Fig. 1.

Fig. 4 is a section taken on line 4—4 of Fig. 3.

Fig. 5 is a vertical section taken on line 5—5 of Fig. 3.

Fig. 6 is a section taken on line 6—6 of Fig. 3.

Fig. 7 is an elevation showing the device connected with the draft and check damper of a furnace.

The device consists of a casing 1 adapted to be positioned in a convenient part of a dwelling or building and to this casing is attached a tube 2 extending through the floor and through which tube passes the cord or cable ends 3 and 4 connected with the draft and check dampers. A diagrammatic view of a furnace is shown in connection with Fig. 7 illustrating the connection of cables with dampers. These cables extend upward into the case each passing over an idler pulley 5 and 6 respectively. The pulleys are each rotatably mounted on a shaft supported within the casing. The supports for each shaft are spaced a considerable distance apart approximately equal to the length of the drum 7 on which the cables are wound and the pulley is loose on the shaft to permit the same to traverse the shaft during its revolution and to be maintained in alignment with the cable as it passes onto or off from the drum which is grooved to receive the cable. This cable is simply wound about the drum with the two ends extending over the respective pulleys and to the draft and check dampers so that as one end is wound up the other end is unwound from the drum. This drum is loosely mounted on a shaft 8 and attached to the drum is a gear 9. Adjacent the gear 9 rotatably mounted on the shaft is another larger gear 10 secured to which is a cylindrical member 11 supported in a bearing 12 in the front cover 46 of the case 1. On the outer end of the member 11 is a lever 13 attached thereto having a pointer member 14 and by operation of this lever the member 11 and gear 10 may be rotated. The gear 10, as shown in Fig. 6, which is a view with the front face of the casing removed, meshes with an idler gear 15 on the shaft 16. On this shaft 16 is a larger gear 17 which meshes with the gear 9 of the drum. The gears 15 and 17 are mounted in brackets provided in the frame or case and, as the gear 10 and hub therefor and the gear 9 and drum 7 are loose on the shaft, the turning of the handle 13 rotates the gear 10 and the drum 7 in one direction or the other and thus permits a manual operation of the draft damper which may be turned with the pointer indicating "Open" or "Closed," as will be understood from Fig. 1. The shaft 8 is provided with a collar 18 pinned thereto being positioned in a recess in the end of the hub 19 of the drum. This collar 18 positions the drum on the shaft, the hub 12 of the gear 10 being provided with a shoulder which engages against an end of the bearing 12 therefor. Thus, the gears and the drum are held in relative relationship. The end 19 of the drum provides one member of a jaw clutch, the other member of which is provided on the adjacent face of the clutch member 20 which is splined to the shaft 8. The clutch faces 19 and 20 are never out of mesh and merely provide a slip connection between the two parts. The opposite face of the member 20 is provided with a clutch face 21 adapted to engage the corresponding face 22 of a notched plate 23 which is secured to the end 24 of the spring case. This plate is also pinned to the shaft 8. When the clutch members 21 and 22 are in engagement as shown in Fig. 3, rotation of the shaft 8 and plate 23 rotates the drum 7. As before stated, the clutch face 19 of the drum and clutch member 20 are so designed as to be in operative relationship when the clutch members 21 and 22 are engaged and when the member 20 is moved to the right of the position shown in Fig. 3 disconnecting the clutch members 21 and 22, the clutch faces 19 and 20 remain in engagement as at no time is the clutch 19 disengaged from the member 20.

The spring motor 26 is of an ordinary type formed of several sections, the end section 24 heretofore mentioned containing a spirally coiled spring 27, the inner end of which is attached to a sleeve 28 rotatable on the shaft 8. The outer end of the coiled spring 27 is attached to the periphery of the case 24. Thus, by rotation of the shaft 8, the member 23 is rotated and, by reason of attachment of the case 24 thereto, the outer end of the spring is coiled about the inner end which is attached to the loose sleeve. The next section of the motor consists of a spring 29, the inner end of which is attached to this sleeve 28 to which the inner end of the spring 27 is attached. The outer end of the spring 29 is attached to the central portion 30 of the case which is unattached to the portion 24. This portion 30 of the case extends over the next spring member 31 to which the outer end thereof is attached, the inner end being attached to a second sleeve 32 rotatable on the shaft 8. A fourth spirally wound spring 33 has its inner end attached to the sleeve 32 and the outer end thereof to the end case 34. Thus, by rotation of the shaft 8 the entire series of springs may be wound up. Rotation of the case 24 and outer end of the spring 27 tends to turn the sleeve 28 which in turn tends to wind the inner end of the spring 29, the outer end being attached to the case 30 tends to wind up the outer end of the spring 31 also attached to the portion 30. By reason of the inner end if this spring 31 being attached to the sleeve 32 the spring 33 is wound from the inner end. To wind the spring I provide a crank 35 having an end adapted to be inserted in the hollow end of the hub member 11, the end of the crank 35 and end of the shaft 8 being correspondingly notched or socketed so that rotation of the crank rotates the shaft 8. The plate 23 attached to the spring case 24 is provided with a notch or lug 36 which the end of the weighted lever 37 engages normally preventing the spring from unwinding.

On the rear wall of the casing is mounted an ordinary clock mechanism 38, here only partially shown but to be understood as being of the usual type except that the face 39 of the clock is on the front plate or face 46 of the casing. This necessitates the use of a long shaft 40 for the hour hand 41 and the tubular member 42 thereon for the minute hand 43, the minute hand being driven by a gear 44 on the tube and the shaft 40 being driven by a gear 45 of the clock mechanism, the two gears being timed to operate in the usual way.

From the foregoing it will be understood that the spring motor is disconnected from the winding drum when the clutch 21 is disengaged from the companion member 22 at which time it is possible to normally rotate the drum by the lever 13 to open the draft damper or close the same and open the check damper. When the clutch members 21 and 22 are engaged, as shown in Fig. 3, the lever 13 may not be operated as the same is held from being manually turned by reason of connection of the drum with the motor.

To operate the member 20 and to give a visible indication of the position of the member I employ two push buttons as will be understood from Fig. 1 projecting from the face of the plate 46. The button or plug 50 is designated as the "on" button and the button 51 is designated as the "off" button as will be understood from Fig. 1. These buttons or plugs ride in bearings provided in the front cover member 46 and each bearing is provided with a downwardly extending recessed portion 52 having a threaded plug 53 in the end above which is a spring 54 engaging a ball 55. Each button or plug is provided with two semi-circular recesses 56 and 57 in which the ball may engage to hold the plug in its set position as will be understood from Fig. 3. In the said Fig., the plug 50 has been pushed inward to its full extent, the ball 55 riding in the outer recess 56 tending to hold the plug in position. The other plug 51, as will be understood, is in its outermost position. In fact only one plug may be moved inward at a time as the mechanism connected therewith causes one plug to be projected outwardly when the other is moved inwardly of the casing. These plugs are utilized to throw the clutch member 20 to engage or disengage the clutch members 21 and 22. The member 20 has a circumferential groove and the lever 58 for operating the clutch member 20 is bifurcated at the lower end and provided with pins as shown in dotted lines in Fig. 6 riding in the groove of the said member. The lever 58 is secured to a cross shaft 59 rotatably mounted in bearings in opposite sides of the casing. The upper end of the lever 58 is also bifurcated through which a pin extends pivotally securing thereto two links 60 and 61 extending into this bifurcation. The link 61, as will be understood particularly from Fig. 6, is pivotally attached to the end of an arm 62, which arm is formed integral with a cylindrical member 63 rotatably mounted on a cross shaft 64. This member 63 has attached thereto an arm 65 which is pivotally connected to the inner end of the plug 51, and it is to be noted that the arm 62 is positioned above the center of the shaft 64. The link 60 connects with an arm 66 on a cylindrical member 67 rotatable on the same shaft 64. This arm 66 extends below the said shaft. On the member 67 is also an upwardly extending arm 68 to which the inner end of the plug 50 is connected preferably by means of a link 69 as shown in Fig. 3. The arm 65 is also connected with the plug 51 by means of a link 70 shown in section in Fig. 6. By reason of the link 60 being connected to an arm below the center of the shaft 64 and the link 61 connected to an arm extending above the shaft and both links pivotally connected with the end of the lever 58, one plug is positioned outwardly when the other one is positioned inwardly. That is, with the position of the parts shown in Fig. 3 in which the parts are set to be actuated by the spring motor and in which it is impossible to manually control the draft dampers, if it be desired to release the furnace dampers from automatic operation, the plug 51 which is designated as "off" in Fig. 1 is positioned inwardly. This moves the arm 65 and arm 62 toward the rear of the case pushing on the link 61 and moving the upper end of the lever 68 away from the front and withdrawing the clutch member. This movement of the link 61 and lever 58 pulls on the rod 60 which being attached to the arm 66 below the shaft pulls the said arm toward the rear of the case and moves the arm 68 toward the front which pushes the plug 50 outwardly by the connecting link 69. This movement of the plug 50 causes the ball to be depressed out of the pocket 56 and when the plug has been fully projected the ball drops into the recess 57 in the lower side of the plug thus tending to hold it in position. While I have shown both plugs provided with the spring-pressed ball retainer it is not necessary to provide more than one of the plugs with the ball retainer.

As heretofore stated, I prefer to utilize the spring motor to operate the clock mechanism although this is not absolutely essential. For this purpose I provide the end case or ball 34 of the motor with a gear 71. This gear 71 rotates with this portion 34 of the motor and meshes with a gear 72 on a stub shaft 73 in the rear of the casing. The gear 72 is attached to a larger gear 74 which in turn meshes a gear 75 rotatably mounted on the rear of the casing. This train of gearing will be observed in Figs. 3 and 4 and the gear 75 is in mesh with the gear 76 of the clock mechanism proper. By attaching the rear end of one of the train of spring members with the clock mechanism the said spring at all times tends to drive the clock mechanism irrespective as to whether or not the spring motor is connected or disconnected with the cable drum 7, or whether or not the pawl 37 is released from the notch 36 of the plate 23.

The timing mechanism is utilized to automatically release the spring motor to operation at a predetermined time interval, and this is accomplished through the following described mechanism. The face of the clock is provided with the usual pointer 80 and dial 81 whereby the said pointer may be set at the time indication corresponding to the period when it is desired to release the motor. This pointer is attached to a knurled member 82 to which is attached the shaft 83 extending through the casing to the rear thereof where it extends through the frame of the clock mechanism as will be understood. On this shaft is a relatively rotatable and longitudinally movable sleeve 84 on which is secured a gear 85 driven by a gear 86 of the clock mechanism as will be understood from Fig. 4. This gear is to be understood as being of sufficient width of face to permit the gear 85 to slide thereon so that the gear 85 and the sleeve 84 may be moved longitudinally of the shaft without disengaging the gear 85 from the driving gear 86. This driving gear 86 is connected with the clock mechanism and operated in the manner usual with an alarm clock in which the pointer is set to designate the time at which an alarm may ring. A coiled spring 87 is provided in the clock mechanism as shown in Fig. 3 and tending to move the sleeve 84 forward on the shaft 83. The shaft 83 has attached thereto a pin 88 and the forward end of the member 84 is recessed providing a flange 89 which engages against the pin. This flange is cut away at one side providing a notch and, when this notch comes beneath the pin, the spring projects the sleeve 84 the distance determined by the depth of the notch. It is to be understood that the shaft 83 is prevented from longitudinal movement. This sleeve 84 also has a circumferential groove and a bifurcated arm 89ª extends upward about the sleeve and is provided with pins riding in the groove of the sleeve. This lever is attached to a shaft 90 extending across the frame and forward movement of the sleeve rocks the shaft. On this shaft is also attached a weighted lever 91, the end of which bears on the upper ball end of a rock lever 92 shown particularly in Fig. 5. The opposite end 93 of the rock lever has a pivoted lever 94 thereon having a depending end 95 and, when the end 92 of the rock lever is moved downward, this end 95 engages the projecting end 96 of the latch lever 37 which disengages the same from the notch 36 in the plate 23. This lever 94 has an outwardly bent end 97 engaging behind the arm 93 as will be understood from Fig. 5. The weight 98 on the said lever extends to hold this end 97 in engagement with the arm 93 and movement of the arm 93 to release the latch 37 causes the end 97 to engage the arm 93 and hold the lever 94 from turning on its pivot during the releasing operation. This releasing movement may be sufficient to carry the end 95 of the pivoted lever 94 over the end 96 of the latch lever. On reverse movement of the lever 93 when released by the operating lever 91, the lever 94 may turn on its pivot and pass over the end 96 of the latch lever 37.

When the latch lever 37 is released from the wheel 23, the spring motor may operate rotating the shaft 8 and, if the clutch members 21 and 22 are in engagement, rotating the drum 7 to open the draft damper. As heretofore stated, the two ends of the cord are used one for the draft damper and one for the check draft, the arrangement being such that subsequent to the closing of the draft damper a movement of the drum will start to open a check draft. The spring motor, however, is utilized to open the draft damper and the closing thereof and opening of the check draft is accomplished by operation of the handle 13.

Upon release of the lever 37 the motor would tend to rapidly unwind causing too sudden movement of the drum, cables and dampers. I have therefore provided an automatic brake mechanism shown in Figs. 3 and 6. As shown in Fig. 3 the case at the upper end is provided with a coned clutch face 100 in which a cone clutch member 101 tends to seat. This member 101 is slidably mounted on the shaft 102 carried by the bracket in the forward plate of the casing and in a lug toward the rear thereof and this clutch member 101 has a hub to which is attached on opposite sides a pair of flat flexible spring members 103 weighted at the center with weight members 105. The opposite ends of the springs 103 and 104 are attached to a hub 106 to which is attached a gear 107 meshing with the driving gears hereinafter mentioned. A collar 108 is pinned to the shaft and the hub 106 engages thereagainst preventing movement of the gear and attached clutch member to the right of the position shown in Fig. 3. When the gear 107 is revolved rapidly the weights 105 tend to fly outwardly drawing the clutch member 101 into engagement with its companion 100 and the frictional contact of the two clutch members reduces the speed of rotation of the motor.

The normal position of the clutch relative to its face may be adjusted. For this purpose I provide a cross shaft 109 shown in Fig. 5 to which is attached a bifurcated arm 110 engaging in a circumferentially grooved member 111 on the clutch shaft 102. This shaft 109 extends through and is threaded in one side of the casing and is provided with a head 112 by means of which it may be turned to move the shaft 102 longitudinally in its bearing due to the engagement of the collar 108 with the member 106 on the shaft. This adjusts the position of the clutch member relative to its companion. A lock nut 113 is provided on the threaded end of the shaft 109 by which means the shaft may be locked in its adjusted position fixedly holding the shaft 102. The gear 107 meshes with the gear 120 which in turn meshes with the gear 121 thence with the gear 122 which finally meshes with a gear 123 attached to the disc 23 and motor case 24. By means of this train of gearing the brake mechanism is operated. The gears are each supported in brackets provided in the interior of the case and the gear 120 is less in width of face than the gear 107 with which it meshes thus permitting longitudinal movement of the gear 107 relative to its driving gear and permitting the adjustment of the brake mechanism heretofore described.

From the foregoing description it becomes evident that the several objects of the invention are secured by a construction that is comparatively simple and efficient in operation, the motor and control devices providing a means whereby the regulator may be set to automatically open the draft at any predetermined period or set to permit a manual control of the check and draft dampers of a furnace and that the apparatus is of neat appearance and easily installed.

Having thus fully described my invention, what I desire to secure by Letters Patent of the United States is—

1. In a draft regulator for furnaces in combination with the check and draft dampers thereof, a drum, a cable wound about the drum, the opposite ends of the cables being connected respectively with the check and draft dampers, a shaft on which the drum is rotatably mounted, a spring motor secured to the shaft normally held from rotation of the shaft, a clutch device for connecting or disconnecting the drum with the motor, a manual means for rotating the drum when disconnected from the motor, a clock mechanism, continuously operated by the spring motor, and means operated by the clock mechanism at a predetermined time interval for releasing the motor to operation of the shaft.

2. A draft regulator for furnaces, comprising a casing, a shaft rotatably supported therein, a spring motor attached to the shaft, a drum rotatable on the shaft, a cable wound about the drum, the opposite ends of the cable extending from the casing for connection with the draft and check dampers of the furnace, a clutch device operable from the exterior of the case for connecting and disconnecting the drum with the motor, a manual means in geared relation with the drum for rotating the same when disconnected from the motor, a latch device for holding the motor from operation, of the drum, a clock operated by the spring motor, and a clock actuated mechanism for operating the latch device to release the motor to operation of the drum.

3. A draft regulator for furnaces comprising a casing, a shaft, a spring motor, a drum rotatable on the shaft, a clutch for connecting or disconnecting the drum with the motor, a manual device for rotating the drum when disconnected with the motor, a cable wound about the drum having opposite ends thereof extending to the draft device of a furnace, time controlled mechanism for releasing the motor to operation, and a gear train between the motor and the time controlled mechanism whereby said mechanism is continuously operated.

4. A draft regulator for furnaces comprising a casing, a drum rotatably supported therewithin, a spring motor, a clutch for connecting or disconnecting the drum and motor, a manual device positioned externally of the casing for rotating the drum when disconnected with the motor, a cable adapted to be wound on the drum and having an end connected with the draft damper, the motor being normally held from operation, time controlled mechanism for releasing the motor to operation, said mechanism being actuated by the spring motor.

5. A draft regulator for furnaces comprising a casing, a shaft rotatably mounted therein, a spring motor on the shaft, a drum rotatable on the shaft, a cable wound about the drum having opposite ends extending from the casing to the draft and check dampers respectively of a furnace, a clutch on the shaft adapted to connect or disconnect the drum with the motor, a cylindrical member rotatably mounted on the shaft extending through the casing, a lever on the exterior of the casing attached to the cylindrical member, a train of gears between the cylindrical member and the drum, the gear train causing movement of the drum in excess of the extent of movement of the cylindrical member, a latch device for holding the spring motor from operation, and clock controlled mechanism for releasing the latch.

6. A draft regulator for furnaces comprising a casing, a drum rotatably supported therein, a spring motor, a clutch device for connecting or disconnecting the drum and motor, an operating lever for the clutch, a pair of push buttons positioned exteriorly of the case one being adapted to operate the lever in one direction and the other to operate the lever in an opposite direction, a manual device positioned externally of the casing for rotating the drum when disconnected with the motor, a cable wound on the drum and having an end connected with the draft damper, a latch device normally preventing operation of the motor, and time controlled mechanism for releasing the motor to operation.

7. A draft regulator for furnaces comprising a casing, a drum rotatably supported therewithin, a spring motor, a clutch device, means for operating the same to connect or disconnect the drum and motor, a manually operable lever positioned externally of the casing adapted to rotate the drum when disconnected with the motor, a cable wound on the drum and having an end connected with the draft damper, a releasable device normally holding the motor from operation at one end, a clock mechanism in geared relation with the other end of the spring motor whereby the clock mechanism is continuously operated, a latch releasing device for releasing the motor to operation at the forward end to rotate the drum when connected therewith, and means for actuating the release mechanism adapted to be set to operate at a predetermined time interval and controlled by the clock mechanism.

In testimony whereof, I sign this specification.

NORMAN W. VAN HUSEN.